(No Model.)
C. M. WESTCOTT.
THILL COUPLING.
No. 299,443.　　　　　　　Patented May 27, 1884.
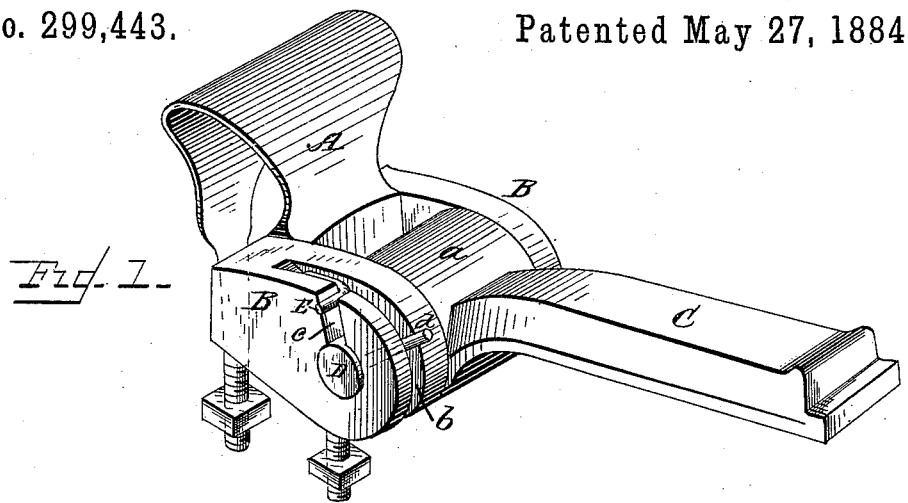
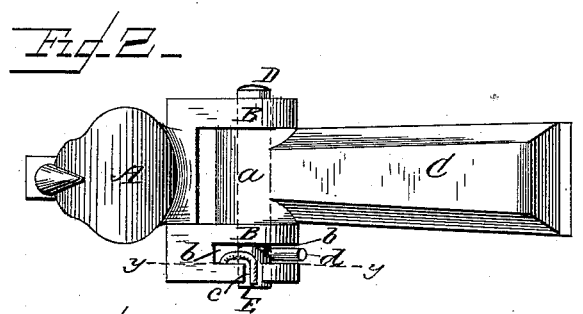
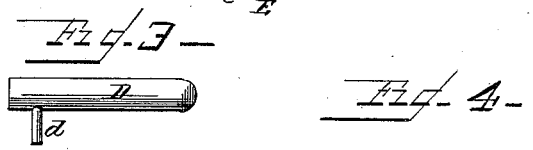
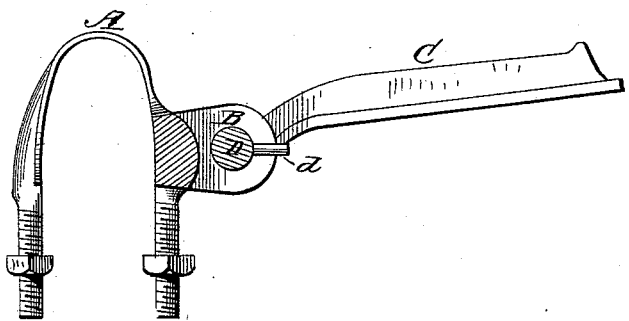
WITNESSES
Franck L. Ourand
L. L. Miller
INVENTOR
Charlie M. Westcott,
per Chas. H. Fowler
Attorney

UNITED STATES PATENT OFFICE.

CHARLIE M. WESTCOTT, OF EL PASO, ILLINOIS.

THILL-COUPLING.

SPECIFICATION forming part of Letters Patent No. 299,443, dated May 27, 1884.

Application filed April 14, 1884. (No model.)

*To all whom it may concern:*

Be it known that I, CHARLIE M. WESTCOTT, a citizen of the United States, residing at El Paso, in the county of Woodford and State of Illinois, have invented certain new and useful Improvements in Thill-Couplings; and I do hereby declare that the following is a full, clear, and exact description of the same, reference being had to the annexed drawings, making a part of this specification, and to the letters and figures of reference marked thereon.

Figure 1 of the drawings is a perspective view of my improved thill-coupling; Fig. 2, a top plan view thereof; Fig. 3, a detail view of the coupling-bolt, and Fig. 4 a sectional view of the thill-coupling taken on line $y\ y$ of Fig. 2.

The present invention has relation to certain new and useful improvements in draw-clips and couplings for attaching the shafts or thills to the forward axles of wagons and other vehicles, and the object thereof is to provide a simple, durable, and effective device for the purpose above named, in which the usual thumb-screws, metal followers with elastic cushions, lever-springs, and other like attachments usually employed are entirely dispensed with, thus rendering the device both simple and capable of being manufactured at a small cost and less liable to get out of order. These several objects above mentioned I attain by the construction substantially as shown in the drawings and hereinafter described and claimed.

In the accompanying drawings, A represents a clip, of any suitable construction, adapted for attachment to the forward axle of a wheeled vehicle. This clip A is cast with the ears B, between which the eye $a$ of the thill-iron C is confined and held by a coupling-bolt, D, said bolt having thereon a pin, $d$. One of the ears B is of increased thickness, and has a slit, $b$, through it a portion of its length, which divides the ear in two sections, leaving a sufficient space between for the working of the pin $d$, and also a latch-pin, E, as shown in Fig. 1. An open slot, $c$, extends down at an angle and joins the hole in the ear, and is for the purpose of allowing the withdrawal of the bolt D when the latch-pin E is raised sufficiently to disengage it with the slot.

In the position shown in Fig. 1 the thill-iron is securely coupled to the clip, the position of the latch-pin in the slot preventing the pin on the bolt being brought in position to pass out of said slot, thus confining it between the two sections of ear. This provides not only a very practical means of coupling the thill to the axle, and, as the bolt does not turn with the thill-eye, as is usually the case in the common and well-known coupling, there is no wear on the bolt, and if lost or broken a new bolt can be procured at a small cost. The position of the thill does not interfere with disconnecting it when desired, and, as a means of securely and firmly coupling the thill-iron to the clip, the pivoted latch-pin and pin on bolt are considered both simple and practical.

Having now fully described my invention, what I claim as new, and desire to secure by Letters Patent, is—

In a thill-coupling, a suitable thill-iron provided with an eye, and a bolt having a pin thereon, in combination with a clip cast with ears, one of which is divided in sections by a slit extending through it, one of said sections having an open slot joining with the hole in the ear, substantially as and for the purpose set forth.

In testimony that I claim the above, I have hereunto subscribed my name in the presence of two witnesses.

CHARLIE M. WESTCOTT.

Witnesses:
S. T. ROGERS,
FRANK B. STITT.